Sept. 14, 1943.   J. R. MOWERY, JR., ET AL   2,329,357
CUTTING MACHINE
Filed March 10, 1942   2 Sheets-Sheet 1

INVENTORS
Jesse R. Mowery
Wallace W. Gardner
BY Ramsey, Kent, Chisholm
ATTORNEYS

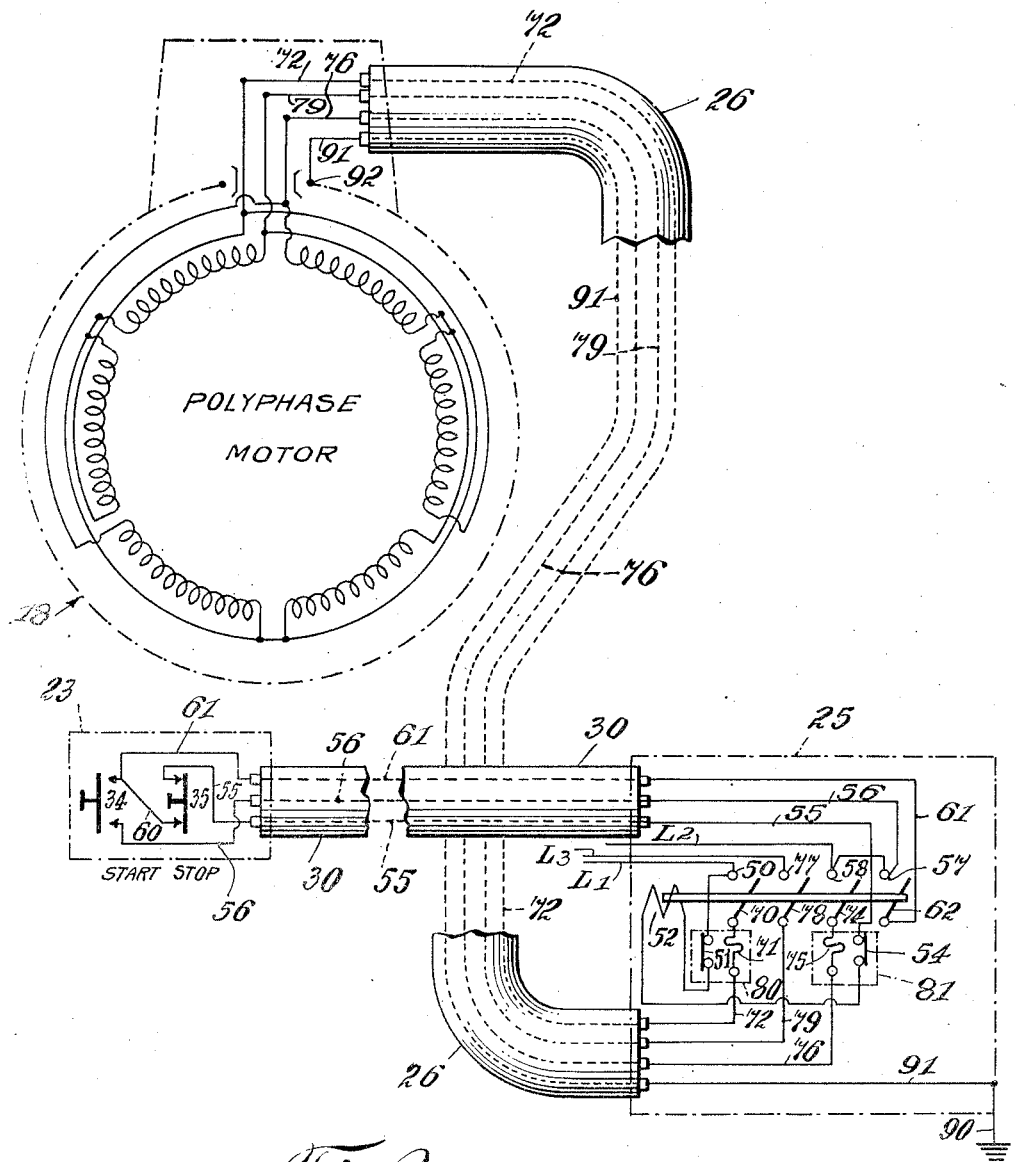

Patented Sept. 14, 1943

2,329,357

UNITED STATES PATENT OFFICE 2,329,357

CUTTING MACHINE

Jesse R. Mowery, Jr., and Wallace W. Gardner, Lancaster, Pa., assignors to De Walt Products Corporation, Lancaster, Pa., a corporation of Pennsylvania Application March 10, 1942, Serial No. 434,088

5 Claims. (Cl. 143—6)

This invention relates to circular saws and other cutting machines that are constructed and operated in a similar manner.

In the usual machine of this type, the saw blade or cutter is manually moved along a horizontal arm which projects over a cutting bed on which is placed the lumber or material to be cut. Ordinarily the saw blade or cutter is driven by an electric motor which is moved back and forth to move the cutting blade. Provision is usually made for tilting the motor on a horizontal axis, and also for swinging it on a vertical axis, to thereby position the cutting blade in positions desired for certain types of cuts.

The reciprocation, tilting, and swinging of the electric motor make it almost essential that a flexible cable be used to carry the current to the motor. Also switching means must be provided to switch the current on and off. The provision of satisfactory switching means has presented considerable difficulty, particularly where large size motors were used, as relatively large and bulky switches are required to properly make and break a circuit carrying heavy currents.

A large and bulky switch at the front of the machine is in the way; it is apt to be bumped by the operator's body, and by lumber being brought to the machine. A switch at the back of the machine is not conveniently accessible. A large switch on the motor adds too much to the movable motor unit; and any switch on the motor is apt to be inconvenient when the motor is tilted or swung into extreme positions. Also, since the motor is extensively shifted about, a switch on the motor does not give the operator one definite place to reach for the switch. Furthermore, a switch in the vicinity of the cutting blade may be a hazard, particularly if the operator is absent-minded or if his attention be distracted.

A general object of the present invention is to provide for cutting machines of the class referred to an improved electric power supply and switching means.

Another object of the invention is to provide for cutting machines of the class referred to a power supply including manually operable switching means located conveniently for the operator and at a definite location.

A further object of the invention is to provide such cutting machines with conveniently located switching means without burdening the motor-and-cutter unit therewith.

A still further object of the invention is to provide cutting machines of this type with conveniently located control switching means at a definite location and with relay power-switching means located out of the way of the operator and remote from the moving parts of the machine.

Fig. 1 of the drawings is a fragmentary and somewhat diagrammatic side elevation, partly in section, showing a sawing machine having power supply and switching means embodying the present invention.

Fig. 3 is a schematic diagram showing primarily the electric circuit used in Fig. 1.

Figure 1:
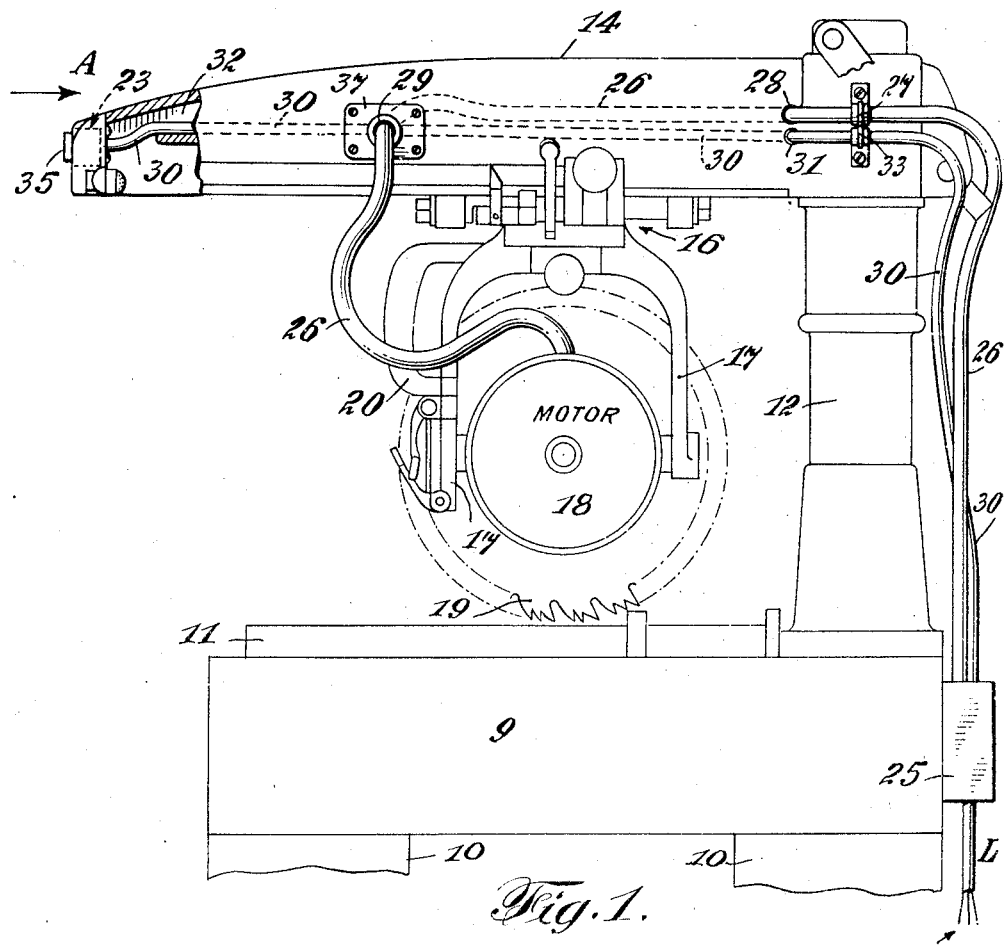

Reference will first be had to Fig. 1. A machine bed 9 is supported by four legs 10 (two shown) and has mounted thereon a work-holding table 11. A column 12 of adjustable height extends upwardly from bed 9 and supports an overhanging horizontal arm 14. This arm is shiftable in a horizontal plane into various angular positions in which it can be locked.

Mounted for manual reciprocation along arm 14 is a carriage 16 which may be of any suitable type. This carriage may have rollers traveling on tracks incorporated in arm 14; and the arrangement may, for example, be such as shown in U. S. patent to Knapp 2,185,304 issued January 2, 1940. Depending from carriage 16 is a yoke 17. Mounted on a horizontal axis in this yoke is an electric-motor-and-cutter unit comprising motor 18 and a circular saw blade 19 attached directly to the motor shaft. Suitable provision is made for locking the motor in any adjusted position on its horizontal axis, and for turning the yoke 17 about a vertical axis and locking it in any adjusted position. By means of the handle 20 the operator can reciprocate the motor-and-saw unit along the arm 14 to effect a cut in work positioned on table 11.

The foregoing structure, briefly described in the preceding two paragraphs, is already known in the art.

Figure 2:
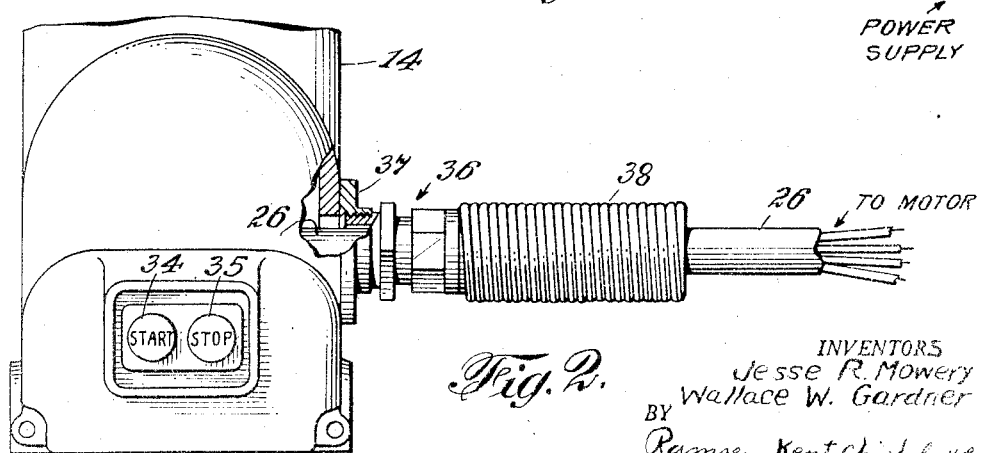
Fig. 2 is a fragmentary front elevation, partly in section, showing the front end of the projecting horizontal arm and a section of a power cable that runs from the horizontal arm to the motor; viewed as per arrow A in Fig. 1.

A power supply cable L, in this instance for three phase current, enters a power relay box 25 that is mounted on the back of bed 9. From this box 25 a power cable 26 extends upwardly, is clamped at 27 to the back end of arm 14, enters the arm 14 at 28, extends along a passageway within the arm, leaves the arm at 29, and extends to the motor 18. Point 29 may be about midway of the length travel of motor 18 along arm 14. A control cable 30 extends upwardly from relay box 25, is clamped to the back of arm 14 at 33, enters the back portion of the arm at 31, extends along a passageway 32 within the arm, and is connected to the contacts of start and stop push buttons 34 and 35 (see Fig. 2) mounted on the front end of arm 14. These push buttons may be part of an assembly designated as a whole by 23.

The power cable 26 in emerging from the arm 14 at 29 passes through a fitting 36. This fitting has one end screwed into a flanged member 37 which is fixedly attached to arm 14, and has the other end in the form of a closely wound helical spring 38 which embraces a length of the cable 26. As the motor 18 is moved or tilted the spring 38 bends and lends a certain amount of support to the cable 26 in the zone adjacent to the arm 14. This prevents sharp bending of cable 26 at this point, thereby minimizing breaking or wearing strains upon cable 26 where it leaves the arm 14.

Reference will now be had to Fig. 3. The start push button 34 is biased open and the stop push button 35 is biased closed. To start the motor, push button 34 is temporarily depressed. This completes a circuit from power line $L_1$, relay contact 50, overload switch 51, winding of relay 52, overload switch 54, conductor 55, push button unit 35, conductor 60, push button unit 34, conductor 56, and relay contacts 57 and 58, to power supply line $L_2$. The energization of the winding of relay 52 actuates the relay and brings the four movable contacts thereof into engagement with the four respective stationary contacts. This completes a holding circuit for the relay as follows: Power supply line $L_1$, relay contact 50, overload switch 51, relay winding 52, overload switch 54, conductor 55, push button unit 35, conductor 60, conductor 61, relay armature 62, and relay contacts 57 and 58, to line $L_2$. Thus the relay remains operated after start push button 34 has been released and has returned to open position.

With relay 52 operated, power is supplied to the motor from the three lines $L_1$, $L_2$, and $L_3$ as follows: Power line $L_1$, relay contact 50, relay armature 70, heater element 71, and conductor 72 to the motor; also power line $L_2$, relay contact 58, relay armature 74, heater element 75, and conductor 76 to the motor; and also power line $L_3$, relay contact 77, relay armature 78, and conductor 79 to the motor.

Devices 80 and 81 are the same, and each is a known type of time-lag overload device. Overload switches 51 and 54 are held closed by soldered connections but are adapted to be opened by springs when the soldered connections are melted. Upon prolonged overload, heater elements 71 and 75 melt the soldered connections and allow the switches 51 and 54 to open under the spring action. The opening of either one of these switches 51 or 54 breaks the holding circuit of relay 52 so that the relay returns to non-operated position and the motor stops.

The relay box 25 is grounded at 90 and a ground wire 91 extends to the motor and is connected to the frame thereof at 92.

Assuming that the motor is in operation, it may be stopped by temporarily depressing the stop push button 35. Operation of the stop push button breaks at this point the holding circuit of relay 52, thereby allowing the relay to return to non-operating position and stopping the motor.

It will be apparent that the heavy switching equipment needed for a large motor is all located at the back of the stationary supporting structure of the machine, where there is ample room for it and where it is out of the way. Both the power cable 26 and the control cable 30 are kept out of the way of the operator except for the short length of power cable 26 which extends from point 29 in arm 14 to the motor 18. The control cable 30 and the push buttons 34 and 35 handle only the coil current of relay 52 and hence can be of light duty construction. The start and stop push buttons are conveniently located at the front of the machine where the operator can reach them without difficulty; also the operator has only one place to reach for them, viz., at the end of arm 14. This location is out of the way of the saw, so that there is no danger of the operator's hand coming in the sawing zone as he reaches for the start or stop push button.

In compliance with the patent statutes, we have disclosed the best form in which we have contemplated applying our invention. It will be realized, however, that the invention may be embodied in various specific forms and that therefore the disclosure is illustrative rather than limiting.

What we claim is:

1. In a cutting machine having a stationary supporting structure including a cutting table, a horizontal non-reciprocatory arm extending forwardly over the table and having its rear end supported and its front end free, and an electric-motor-and-cutter unit reciprocably mounted on the arm; the improvement which comprises: the arm being hollowed for the passage of electrical conductors; relay means mounted on the stationary supporting structure remote from the electric motor; power conductors extending from the relay means to the motor to carry the operating current thereto when the relay means is operated, the power conductors being attached to the machine structure adjacent to the rear end of said arm, entering the arm near its rear end, running longitudinally inside of the arm, and leaving the arm in a longitudinally central zone thereof; and manually operable control switching means mounted on the front end of said arm and connected to operate and release said relay means, the connections to the control switching means including control conductors attached to the machine structure adjacent to the rear end of the arm, entering the arm near its rear end, and extending within the arm to the control switching means.

2. In a cutting machine having a stationary supporting structure including a cutting table, a horizontal non-reciprocatory arm extending forwardly over the table and having its rear end supported and its front end free, and an electric-motor-and-cutter unit reciprocably mounted on the arm; the improvement which comprises: the arm being hollowed for the passage of electrical conductors; relay means mounted on the stationary supporting structure remote from the electric motor; power conductors extending from the relay means to the motor to carry the operating current thereto when the relay means is operated, the power conductors entering the arm near its rear end, running longitudinally inside of the arm, and leaving the arm in a longitudinally central zone thereof; and manually operable control switching means mounted on the front end of said arm and connected to operate and release said relay means, the connections to the control switching means including control conductors entering the arm near its rear end and extending within the arm to the control switching means.

3. In a cutting machine having a supporting structure including a cutting table and a horizontal non-reciprocatory arm extending forwardly over the table, the arm having its rear end supported and its front end free, and an electric-motor-and-cutter unit reciprocably mounted on the arm; the improvement which comprises: the arm being hollowed for the passage of electrical conductors; relay means mounted on the supporting structure remote from the electric motor and at the rear of the machine; power conductors extending from the relay means to the motor to carry the operating current thereto when the relay means is operated, the power conductors entering the arm near its rear end, running longitudinally inside of the arm, and leaving the arm in a longitudinally central zone thereof; and manually operable control switching means mounted on the front end of said arm and connected to operate and release said relay means, the connections to the control switching means including control conductors entering the arm near its rear end and extending within the arm to the control switching means.

4. In a cutting machine having a supporting structure including a cutting table and a horizontal non-reciprocatory arm extending forwardly over the table, the arm having its rear end supported and its front end free, and an electric-motor-and-cutter unit reciprocably mounted on the arm; the improvement which comprises: relay means mounted on the supporting structure remote from the electric motor and at the rear of the machine; power conductors extending from the relay means to the motor to carry the operating current thereto when the relay means is operated, the power conductors running along said arm, being attached thereto, and leaving the arm in a longitudinally central zone thereof; and manually operable control switching means mounted on the front end of said arm and connected to operate and release said relay means, the connections to the control switching means including control conductors running along said arm and being attached thereto.

5. In a cutting machine having a supporting structure including a cutting table and a horizontal non-reciprocatory arm extending forwardly over the table, the arm having its rear end supported and its front end free, and an electric-motor-and-cutter unit reciprocably mounted on the arm; the improvement which comprises: relay means mounted on the supporting structure remote from the electric motor and at the rear of the machine; power conductors extending from the relay means to the motor to carry the operating current thereto when the relay means is operated, the power conductors running along said arm, being attached thereto, and leaving the arm in a longitudinally central zone thereof; and manually operable push button means mounted on the front end of said arm and connected to operate and release said relay means, the connections to the push button means including control conductors running along said arm and being attached thereto.

JESSE R. MOWERY, Jr.
WALLACE W. GARDNER.